US012469371B2

(12) United States Patent
Gerst et al.

(10) Patent No.: US 12,469,371 B2
(45) Date of Patent: Nov. 11, 2025

(54) METHOD AND SYSTEM FOR ALERTING INDIVIDUALS EXPERIENCING SENSORY LIMITATIONS AND/OR SENSORY INTERFERENCE

(71) Applicant: CALLER ALERT, LLC, Evansville, IN (US)

(72) Inventors: Jason Gerst, Evansville, IN (US); Alex Adelson, Hoboken, NJ (US); Dan Hilgert, Glencoe, MN (US); Chris Owens, Prior Lake, MN (US); Alex Anderson, Duluth, MN (US); David Eckerson, North Dighton, MA (US); Todd Smith, Hillsboro, OR (US)

(73) Assignee: Caller Alert, LLC, Evansville, IN (US)

( * ) Notice: Subject to any disclaimer, the term of this patent is extended or adjusted under 35 U.S.C. 154(b) by 108 days.

(21) Appl. No.: 18/564,395

(22) PCT Filed: Jun. 30, 2022

(86) PCT No.: PCT/US2022/035843
§ 371 (c)(1),
(2) Date: Nov. 27, 2023

(87) PCT Pub. No.: WO2023/278785
PCT Pub. Date: Jan. 5, 2023

(65) Prior Publication Data

US 2024/0273982 A1 Aug. 15, 2024

Related U.S. Application Data

(60) Provisional application No. 63/216,737, filed on Jun. 30, 2021.

(51) Int. Cl.
*G08B 7/06* (2006.01)
*G08B 27/00* (2006.01)

(52) U.S. Cl.
CPC ............... *G08B 7/06* (2013.01); *G08B 27/00* (2013.01)

(58) Field of Classification Search
CPC .................................. G08B 7/06; G08B 27/00
See application file for complete search history.

(56) References Cited

U.S. PATENT DOCUMENTS 4,775,997 A * 10/1988 West, Jr. ............ H04W 88/021 455/554.1
5,131,019 A * 7/1992 Sheffer ................. G08B 25/08 379/39

(Continued)

*Primary Examiner* — Hoi C Lau
(74) *Attorney, Agent, or Firm* — Martin IP Law Group; C. Richard Martin

(57) ABSTRACT

An apparatus for alerting individuals experiencing sensory limitations and/or sensory interference is provided according to the invention. The apparatus includes a user interface device and an alerting device. The user interface device includes a transceiver, a program and a reporting application. The alerting unit is in wireless communication with said transceiver of said user interface device. The alerting unit comprises a transceiver for wirelessly communicating with said user interface device; a central processing unit for receiving and processing communications from said transceiver; an alert notification device coupled to said central processing unit, said alert notification device configured to provide an alert to a user upon receipt of an alert signal from said central processing unit; and a power supply for providing power to the central processing unit, transceiver and alert notification device of the alerting unit. A method for alerting individuals experiencing sensory limitations and/or sensory interference is also provided.

19 Claims, 5 Drawing Sheets

(56) References Cited

U.S. PATENT DOCUMENTS

| | | | | | |
|---|---|---|---|---|---|
| 5,278,539 | A * | 1/1994 | Lauterbach | G08B 27/008 | 379/49 |
| 6,075,451 | A * | 6/2000 | Lebowitz | H04M 11/04 | 340/541 |
| 8,116,724 | B2 * | 2/2012 | Peabody | G08B 25/001 | 455/457 |
| 2008/0085696 | A1 * | 4/2008 | Salahshour | G08B 25/08 | 455/404.1 |
| 2009/0033505 | A1 * | 2/2009 | Jones | G08B 25/10 | 340/657 |
| 2010/0271198 | A1 * | 10/2010 | Boling | G08B 25/08 | 340/539.1 |
| 2010/0285771 | A1 * | 11/2010 | Peabody | G08B 25/001 | 379/38 |
| 2011/0281550 | A1 * | 11/2011 | Peabody | G08B 25/001 | 455/404.2 |
| 2013/0065641 | A1 * | 3/2013 | Gross | G08C 17/00 | 455/556.1 |
| 2015/0199919 | A1 * | 7/2015 | Ander | G08B 7/00 | 340/4.12 |
| 2016/0284038 | A1 * | 9/2016 | Johnson | G16H 50/00 | |
| 2016/0323445 | A1 * | 11/2016 | Warren | H04M 1/72424 | |
| 2020/0394880 | A1 * | 12/2020 | Wedig | G08B 7/066 | |
| 2024/0273982 | A1 * | 8/2024 | Gerst | G08B 1/08 | |

* cited by examiner

METHOD AND SYSTEM FOR ALERTING INDIVIDUALS EXPERIENCING SENSORY LIMITATIONS AND/OR SENSORY INTERFERENCE

BACKGROUND OF THE INVENTION

Field of the Invention

The present disclosure generally relates to a method of and a system for alerting users with sensory limitations and/or users in environments with sensory interference for purposes of safety, timing, and/or convenience.

Description of the Related Art

Alerts of any kind—safety, timing, and/or convenience often fail because both humans and animals can suffer from sensory loss or sensory interference or both. Alerts can be associated with safety issues, event timing, and/or convenience. This can be anywhere from an emergency signal, a phone call, a means for attention, time to do something, and/or something as simple as a call that 'dinner is ready.' Humans and animals often have sensory limitations due to birth, injury, and/or aging. Environments can limit or obscure normal sensory system responses due to increased sound, light, motion, or combinations thereof. Sensory limitations can be from degradation or loss of hearing, sight, feeling, cognition, or combinations thereof. The need for an omnibus solution providing alert functions for any or a variety of sensory constraints in a given environment is the foundation of the system.

SUMMARY OF THE INVENTION

The present invention provides an electronic notification system for individuals with limited or missing sensory systems and/or individuals located in interfering sensory environments. The system is designed to overcome human or animal sensory limitations, losses, or environments subject to interferences at levels that restrict or eliminate or confuse normal sensory system response. The interference can be such things as interfering levels of sound from random background noise, a sound or sounds associated with a specific item or items, intense light, low-level light, varying light, stationary color patterns, changing color patterns, mechanical interaction such as vibrations, shock waves, structural failure or combinations of some or all of these.

According to one presently preferred embodiment of the invention, there is provided an apparatus for alerting individuals experiencing sensory limitations and/or sensory interference comprising a user interface device and an alerting device. The user interface device includes a transceiver, a program and a reporting application. The alerting unit is in wireless communication with said transceiver of said user interface device. The alerting unit comprises a transceiver for wirelessly communicating with said user interface device; a central processing unit for receiving and processing communications from said transceiver; an alert notification device coupled to said central processing unit, said alert notification device configured to provide an alert to a user upon receipt of an alert signal from said central processing unit; and a power supply for providing power to the central processing unit, transceiver and alert notification device of the alerting unit.

The user interface device may be selected from a group consisting of a smartphone, a laptop computer, a desktop computer and a tablet computing device. The alert notification device may be selected from a group consisting of a light source, a sound source and a mechanical source. A driver may be connected to the alert notification device and a power supply electrically coupled to the driver. The driver may be connected to the central processing unit which provides instructions to the driver based upon a software notification subroutine. A plurality of alerting units may be arranged in a mesh network, with each alerting unit in wireless communication with the user interface device and each of the other plurality of alerting devices. Each alerting unit may comprise a mesh network node and may function as a repeater node. One or more repeater nodes may also be provided in wireless communication with the user interface device and each of the plurality of alerting devices.

9. The apparatus for alerting individuals according to claim 8, wherein said repeater node comprises a plurality of repeater nodes.

According to another presently preferred embodiment of the invention, there is provided an apparatus for alerting individuals experiencing sensory limitations and/or sensory interference comprising a hard wired telephone, an integrator circuit, a transceiver and a power supply. The integrator circuit may be electrically coupled to the hard wired telephone, and may include a signal generator coupled to a transmitter; and an alerting unit in wireless communication with said transmitter of said user integrator circuit. The alerting unit may comprise a transceiver for wirelessly communicating with said user integrator circuit; a central processing unit for receiving and processing communications from said transceiver; an alert notification device coupled to said central processing unit, said alert notification device configured to provide an alert to a user upon receipt of an alert signal from said central processing unit; and a power supply for providing power to the central processing unit, transceiver and alert notification device of the alerting unit.

The integrator circuit may further comprises a 20 Hz bandpass filter electrically coupled to the hard wired phone and the integrator circuit to filter the telephone ring signal. The integrator circuit may further comprise a voltage limiter disposed between the bandpass filter and the signal generator. The integrator circuit may have an internal power supply comprising a supercapacitor having an input coupled to the voltage limiter and an output coupled to an AND gate/voltage sensor and a relay. The integrator circuit may have an external power supply further comprising a battery backup power supply.

According to a further presently preferred embodiment of the invention, there is provided a method for alerting individuals experiencing sensory limitations and/or sensory interference comprising the steps of: generating a wireless signal from a user interface device based on a program and a reporting application; transmitting said wireless signal from a transceiver associated with said user interface device; receiving said wireless signal at a transceiver of an alerting unit; using a central processing unit to process said signal utilizing a notification subroutine; and sending a signal from the central processing unit based on the notification subroutine to an alert notification device coupled to said central processing unit; and generating a notification to a user. The notification generated is selected from a group consisting of a light notification, sound notification and mechanical notification. The wireless signal in generated from a user interface device selected from a group consisting of a smartphone, a laptop computer, a desktop computer and a tablet computing device. The step of transmitting said wireless signal between a plurality of alerting units and/or repeater nodes arranged in a mesh network.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

Figure 1:
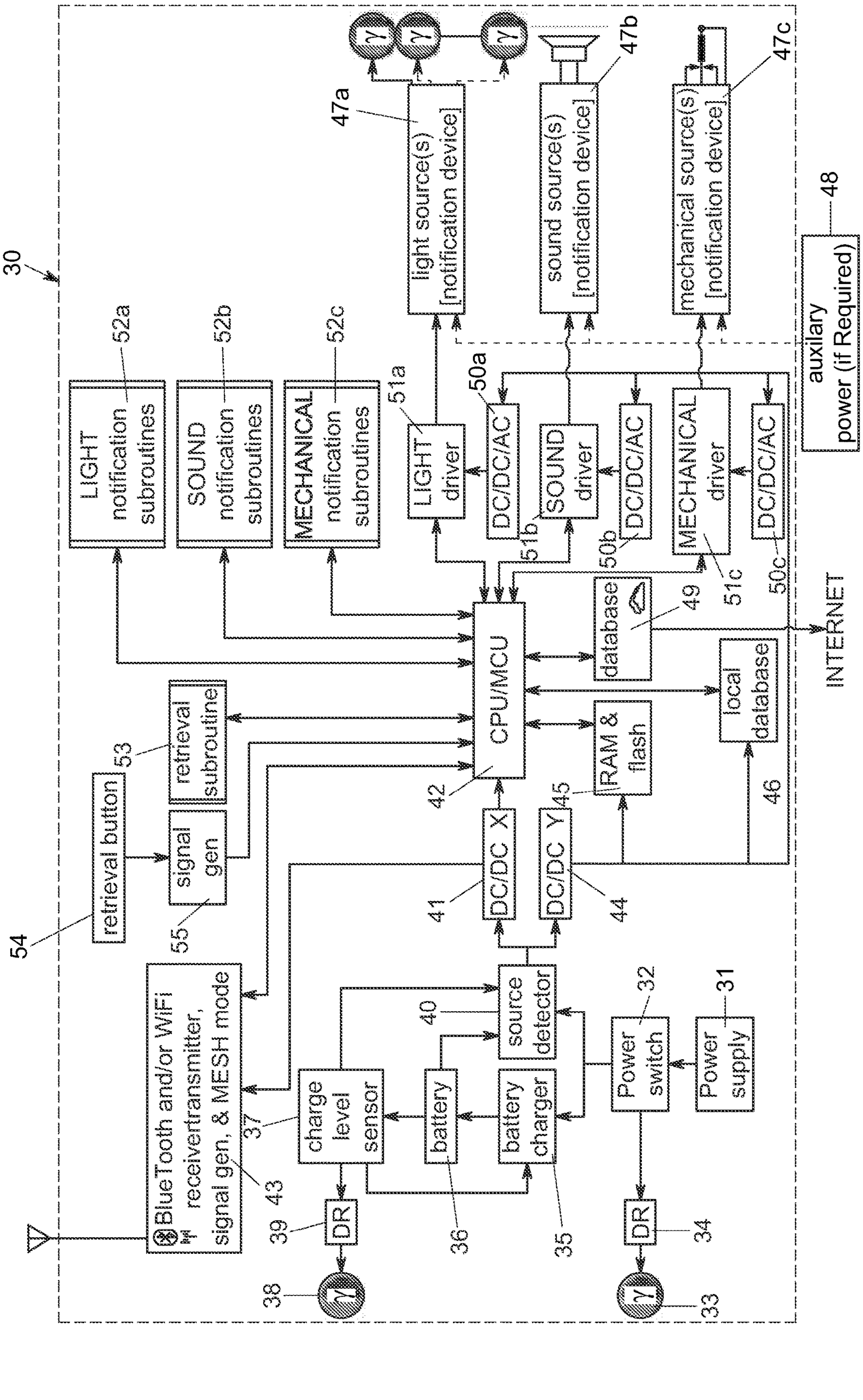
FIG. 1 is a functional diagram of a system for alerting individuals experiencing sensory limitations and/or sensory interference according to a preferred embodiment of the invention.

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

The system 10 for alerting individuals experiencing sensory limitations and/or sensory interference comprises a user interface 20, such as a smartphone 21, laptop computer 22, desktop computer 23, tablet 24 and the like, and an alerting unit 30. The user interface 20 includes a program and a reporting application (app). The alerting unit 30 houses a programed microcontroller that drives, controls, and powers, the behavior of the alerting mechanism(s).

As best shown in FIG. 1, the alerting unit 30 includes a power supply 31, which may, according to the preferred embodiment is an "off the shelf" wall plug with a USB 2 or better output that can supply at least 5 volts DC, 1 amp. The power supply 31 is coupled to a power switch 32, which is preferably a single-throw, double-pole switch. A multicolor (red or green) light source 33 indicates ON/OFF (red is OFF, green is ON). The multicolor light source is preferably an LED source and is coupled to an LED driver 34.

The components of the alerting unit 30 may be housed in an enclosure or small case that can typically be a cylinder or block, 3 to 4 inches in diameter or 3 to 4 inches in width, and typically 4 to 5 inches in height. Size can range larger and smaller, as required by component parameters and notification mechanism components. The alerting unit 30 may have a magnetic, suction cup, and/or a mechanical device for providing preferred secure placements, other than merely resting on a horizontal support surface. The alerting unit 30 may have a dedicated switching device such as a push or touch button when activated sends a signal to any device housing the system App such as a smartphone 21 for purposes of revealing its location.

The power switch 32 is coupled to a battery charger 35, which meets the requirement for charging the battery 36, such as a 4.2V 2400 mAh lithium-ion battery. The battery charger 35 monitors a charge level sensor 37 which measures available battery energy and is electrically coupled to the battery 36 and battery charger 35. When charging a lithium-ion battery and an 85% charge level is reached, or the charge current falls to 3%, the charger is disengaged. A second multicolor (red or green) light source 38 indicates charge level (red<85%, green>85%). The second multicolor light source 38 is preferably an LED source and is coupled to an LED driver 39.

A power source-detector 40 has inputs electrically coupled to the power switch 32, battery 36 and charge level sensor 37. The DC voltage from the power supply 31 powers the alerting unit 30 electronics and notification sources. However, if a power interruption is detected by the source-detector 40, it will automatically switch to the battery 36 (emergency backup).

A DC/DC X converter 41 is provided for powering the CPU/MCU 42—typically 3.2 volts DC—and the transmitter/receiver 43. The transmitter/receiver 43 is a wireless transmitter/receiver, preferably Bluetooth and/or WiFi, and provides two-way wireless communication with other alerting units 30 and the system remote programing and control app as housed in such devices as a smartphone 21, laptop 22, desktop 23, and/or tablet 24. As shown in FIG. 2C, repeaters 25 may also be utilized to extend service area for a given location. Such a system, provides, when required, a wireless connection to a hardwire conventional phone(s) to the be included within the system. The transmitter/receiver 43 may include a smart signal generator directed into or out from the CPU/MCU 42 for system notification selection, "handshake" confirmation, and/or special functionality such as item retrieval. When more than one alerting unit 30 or app housed device 21, 22, 23, 24 is deployed, the wireless capability supports the alerting unit 30 as a Node in a MESH network.

A DC/DC Y converter 44 is provided for powering RAM & flash 45, a local database 46, and low power alert notification devices utilizing light, sound, and/or mechanical energy for overcoming human or animal sensory limitations, losses, and/or environments subject to physical interferences at levels that restrict or eliminate or confuse normal sensory system response. As shown in FIG. 1, the alert notification device(s) may include a light source notification device 47*a*, sound source notification device 47*b*, and/or mechanical source notification device 47*c*. Higher power notification devices may require supplemental power through an auxiliary power supply 48. The RAM & flash 45 are shown separate from the CPU/MCU 42, but they may reside in the CPU/MPU 42. A separate database 49 residing in the Cloud may also be in communication with the CPU/MCU 42 for housing some applications requiring large scalability. The CPU/MCU 42 connects to the separate database 48 via the internet.

The DC/DC Y converter 44 provides power to the light source notification device 47*a* through DC/DC/AC light source power supply 50*a* which supplies power to the light source driver 51*a*, which drives light source notification device 47*a*. The light source driver 51*a* is connected to the CPU/MCU 42 which provides instructions to the light source driver 51*a* based upon the software subroutines 52*a* for light notification styles.

The DC/DC Y converter 44 provides power to the sound source notification device 47*b* through DC/DC/AC sound source power supply 50*b* which supplies power to the sound source driver 51*b* (amplifier), which drives sound source notification device 47*b*. The sound source driver 51*b* is connected to the CPU/MCU 42 which provides instructions to the sound source driver 51*b* based upon the sound notification software subroutines 52*b* for sound notification styles.

The DC/DC Y converter 44 provides power to the mechanical source notification device 47*c* through DC/DC/AC mechanical source power supply 50*c* which supplies power to the mechanical source driver 51*c*, which drives mechanical source notification device 47*c*. The mechanical source driver 51*c* is connected to the CPU/MCU 42 which provides instructions to the mechanical source driver 51*c* based upon the software subroutines 52*c* for mechanical notification styles.

The alerting unit 30 is further provided with a retrieval subroutine 53 in communication with the CPU/MCU 42. The retrieval subroutine 53 is activated by pressing a retrieval button 54 which triggers a signal generator 55 in communication with the CPU/MCU 42.

The system functions electronically as a CPU-MCU 42 controlled circuit that consists of a power supply 31, Bluetooth and/or WiFi receiver/transmitter 43, a series of software subroutines 52*a*, 52*b*, 52*c* that provide pre-set performance routines for light notifications 47*a*, sound notifications 47*b*, and/or mechanical notifications 47*c*. The subroutines 52*a*, 52*b*, 52*c* can be preprogrammed by the supplier or programed by the user or both. Each of the performance routine programs when required, are sent to amplifiers 51*a*, 51*b*, 51*c* that drive the notification energy source(s). If the energy source is to be remotely located a preamplifier 50*a*, 50*b*, 50*c* might be required to drive the amplifier 51*a*, 51*b*, 51*c* driving the notification energy source(s) 47*a*, 47*b*, 47*c*.

Another option can be a wireless connection to the energy source. In that case the performance routine is sent to the transmitter/receiver or another dedicated transmitter/receiver-BlueTooth or WiFi—which establishes a connection with a remotely located energy source which has at least a transmitter/receiver or transponder, amplifier, CPU-MCU, power supply, and energy notification mechanism—light, sound and/or mechanics. A light notification energy source can be a light display using solid or color changing LEDs, halogen bulbs, CFL's, conventional light bulbs, etc. A sound notification energy source can be a conventional coil and magnet speaker, piezoelectric speaker, magnetostrictive speaker, electrostatic speaker, plasma arc speaker, etc. A mechanical notification energy source can a buzzer, vibrator, electric hammer, electronic clicker, etc.

The system supports both BlueTooth and/or WiFi receiver/transmitter capability for supporting all wireless functions. Programing, reporting functions, and required standard protocol requirements are incorporated in an App located in either a smartphone, tablet, desktop, or laptop with BlueTooth and/or WiFi wireless capability.

In accordance with the invention, an electronic signal for initiating an alert notification is initiated by a spontaneous or programmed external signal or a pre-set external or internal signal. The system detects, amplifies, processes, forms, and distributes the alert notification to at least one or an assortment of alert notification devices such as a source or sources of light, sound, and/or mechanics. The signal's path to the alerting device or devices can be wired, wireless, or through a MESH network. The alert output can be composed of simple serial, parallel, or complex patterns occurring in at least one or more alert notification devices. The alert output or outputs can occur at one or multiple devices in parallel, serially, or in patterns. The output can occur serially in multiple devices placed and sequenced for the purpose of guidance.

Programming determines the types and levels of detection and notification method or methods required by the user. Programing is a software or hardware function where the user can choose the options available through the App GUI display.

Notification can be programed from soft to intense employing sound and or light and/or mechanics. Notification can be in the form of messaging, reminding, or alerting Notification can be static or dynamic. It can be in the form of static or dynamic patterning, serial or parallel sequencing, and or static or dynamic leveling. Notification mechanisms are contained within the alerting device 30 or can be connected to exterior notification hardware such as light, sound, and/or mechanical energy sources by wire directly or wirelessly connected.

Figure 2A:
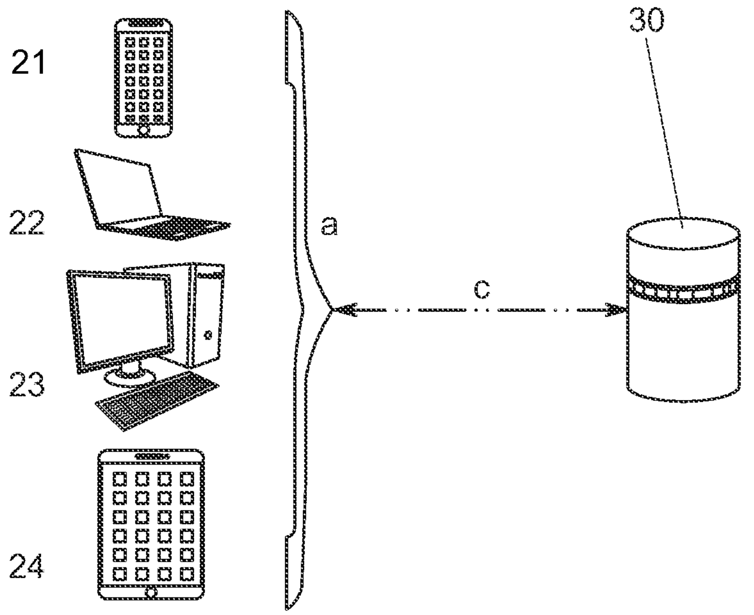
FIG. 2A is diagram depicting a monolithic installation of the system for alerting individuals experiencing sensory limitations and/or sensory interference shown in FIG. 1.

FIG. 2A depicts a monolithic installation of a single alerting unit 30 in accordance with one presently preferred embodiment of the invention. The user interface 20 (smartphone 21, laptop 22, desktop 23 and/or tablet 24) and its associated control app—a user interface (GUI) and software that programs and controls the alerting device 30 that houses and powers the alerting mechanism(s). The App must be in a device with BlueTooth and/or WiFi wireless technology in order to communicate with the alerting device 30. The signal strength between the user interface 20 and alerting device 30 is strong, as shown by the dashed red line shown in FIG. 2A.

Figure 2B:
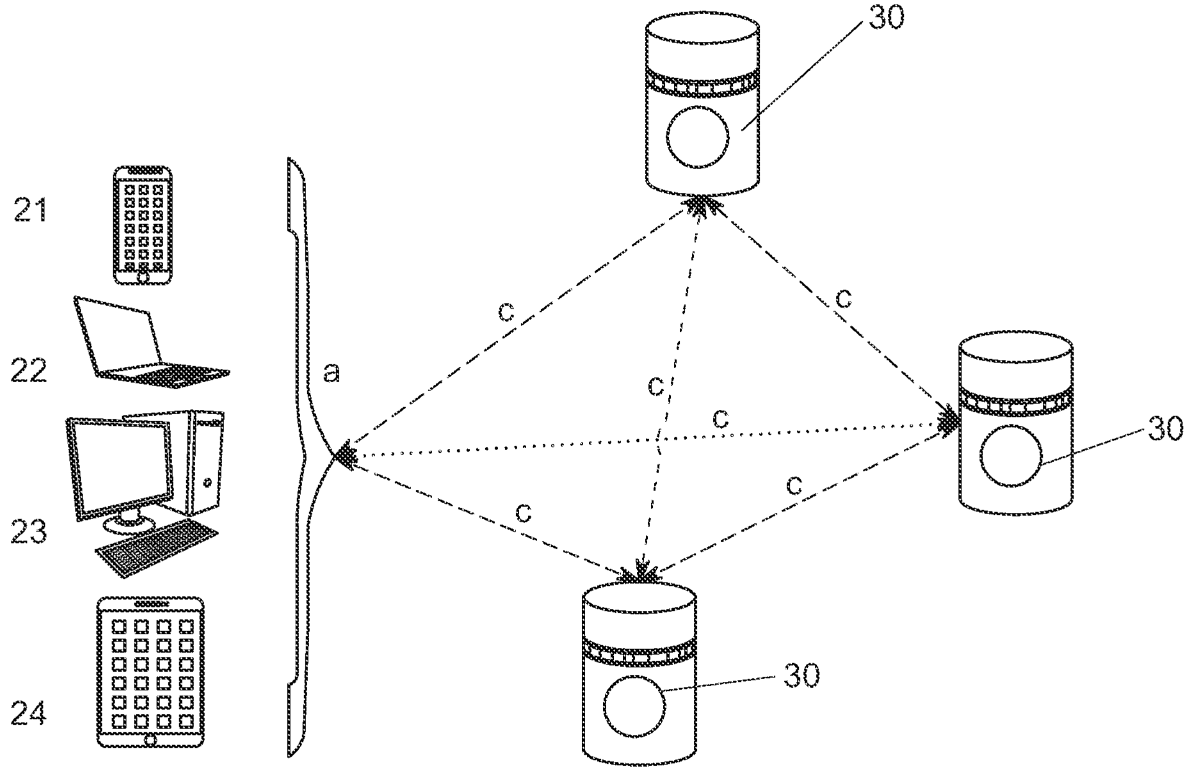
FIG. 2B is diagram depicting a polylithic installation of a plurality (3) of systems for alerting individuals experiencing sensory limitations and/or sensory interference shown in FIG. 1.
Figure 2C:
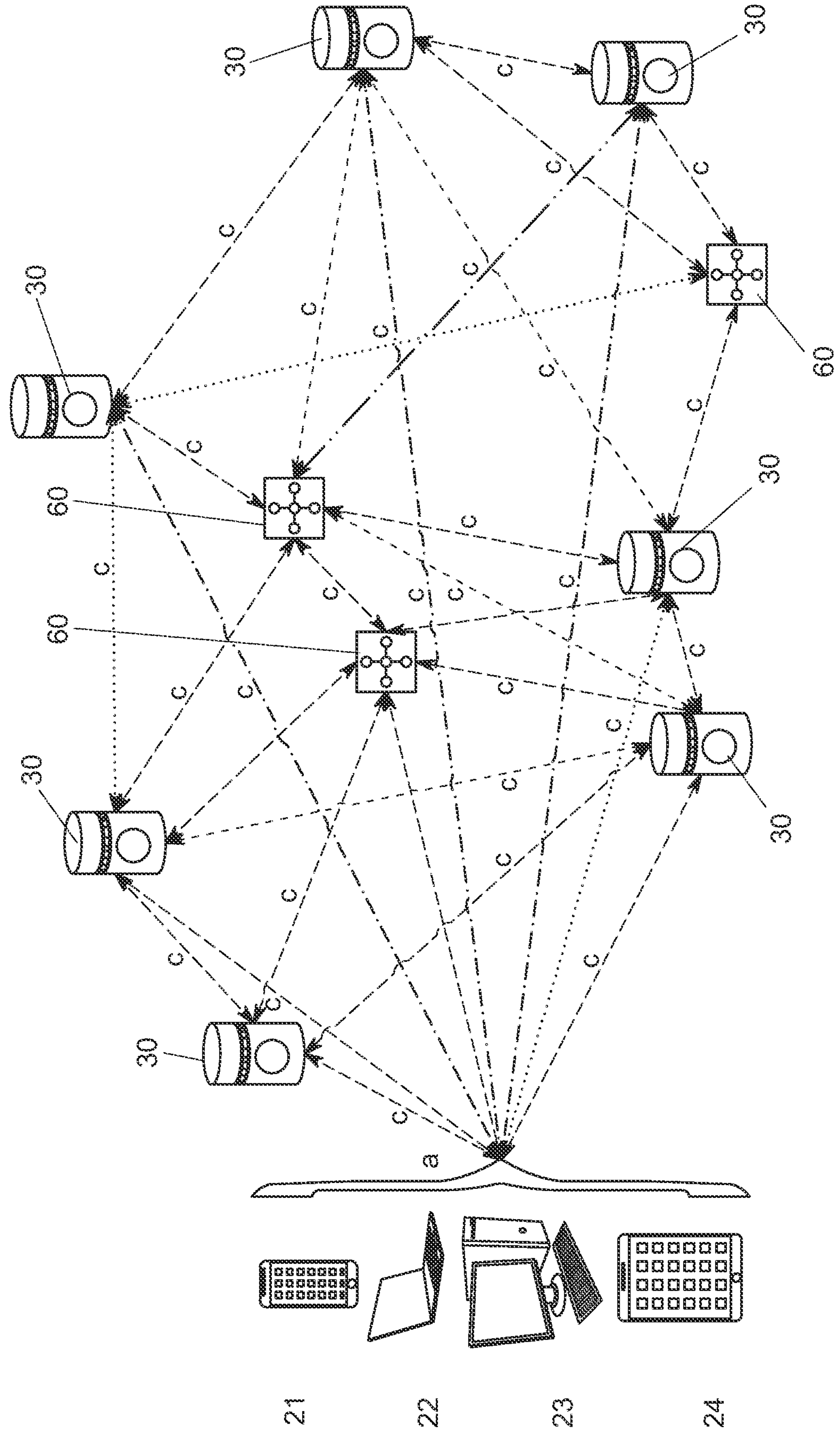
FIG. 2C is diagram depicting a polylithic extended installation of a plurality (7) of systems for alerting individuals experiencing sensory limitations and/or sensory interference shown in FIG. 1.

FIG. 2B depicts a polylithic installation of a plurality (3) of alerting devices 30 arranged in a mesh network. All alerting devices in the mesh network and User Interface and Control App housings are designed to be MESH network nodes as well as function as repeater nodes. A mesh network is a local network topology in which the infrastructure nodes connect directly, dynamically, and non-hierarchically to as many other nodes as possible for a given entity to route data from the originator of the data to the target of the data. There is no dependency on any one node. The signal strength between adjacent alerting devices 30 is strong (shown in dashed red line), the signal between opposing alerting devices 30 is medium (dotted and dashed green line), while the signal strength between the user interface 20 and the most remote alerting device 30 is weak (dotted gray).

As shown in FIG. 2C, in order to further extend the range of the system repeater nodes 60 can be used. Repeaters Nodes are dumb transmitter/receiver devices that upon detecting a data packet (receiver mode) immediately transmit (transmitter mode) the data packet to all other nodes within connecting range. The purpose is to increase the area of system performance. Repeater nodes are designed to amplify the detected data packet to a higher level than the received data packet level when transmitting. The transmitter/receiver are either BlueTooth and/or WiFi wireless technology. The signal strength between adjacent alerting devices 30, alerting devices 30 nearest the user interface 20 and adjacent alerting devices and repeater nodes is strong (shown in dashed red line), the signal strength between more remote alerting devices 30, more remote alerting devices 30 and repeater nodes 60 is medium (dotted and dashed green line). The signal strength between the user interface 20 and more remote alerting devices 30 and between more remote alerting devices 30 are weak (dotted gray line), and the signal strength between the user interface 20 and the most remote alerting devices 30 and/or nodes 60 is very weak (dotted and dashed gray). The use of repeaters 60 and a mesh network ensure stronger signals to each alerting device 30 in the system.

Detection can be wired or wireless or both. Detection levels can be set from low sensitivity to high sensitivity. A MESH network can be added to increase the area of system performance. Internal notifications can be provided from presets within the system.

Figure 3:
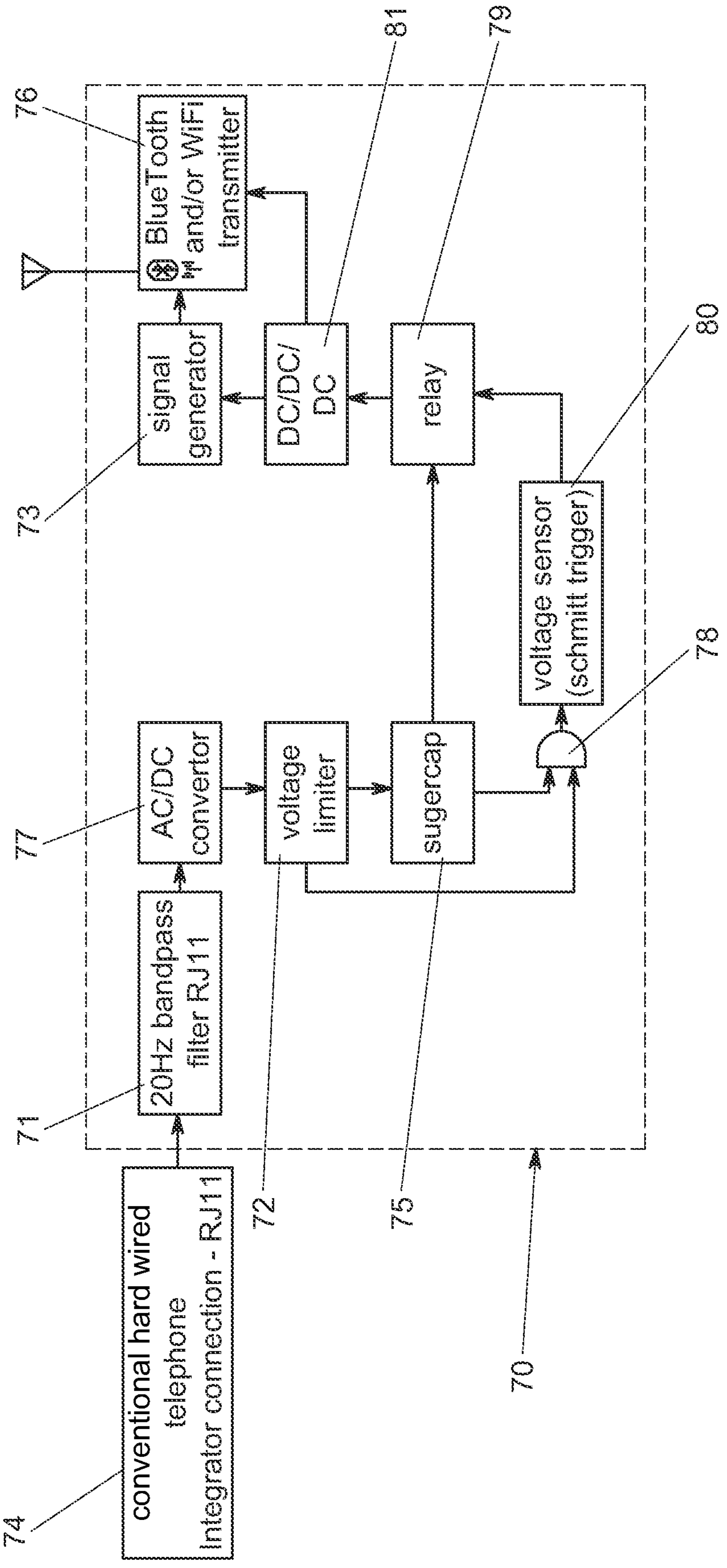
FIG. 3 is functional diagram of a conventional telephone wireless integrator with internal power supply.
Figure 4:
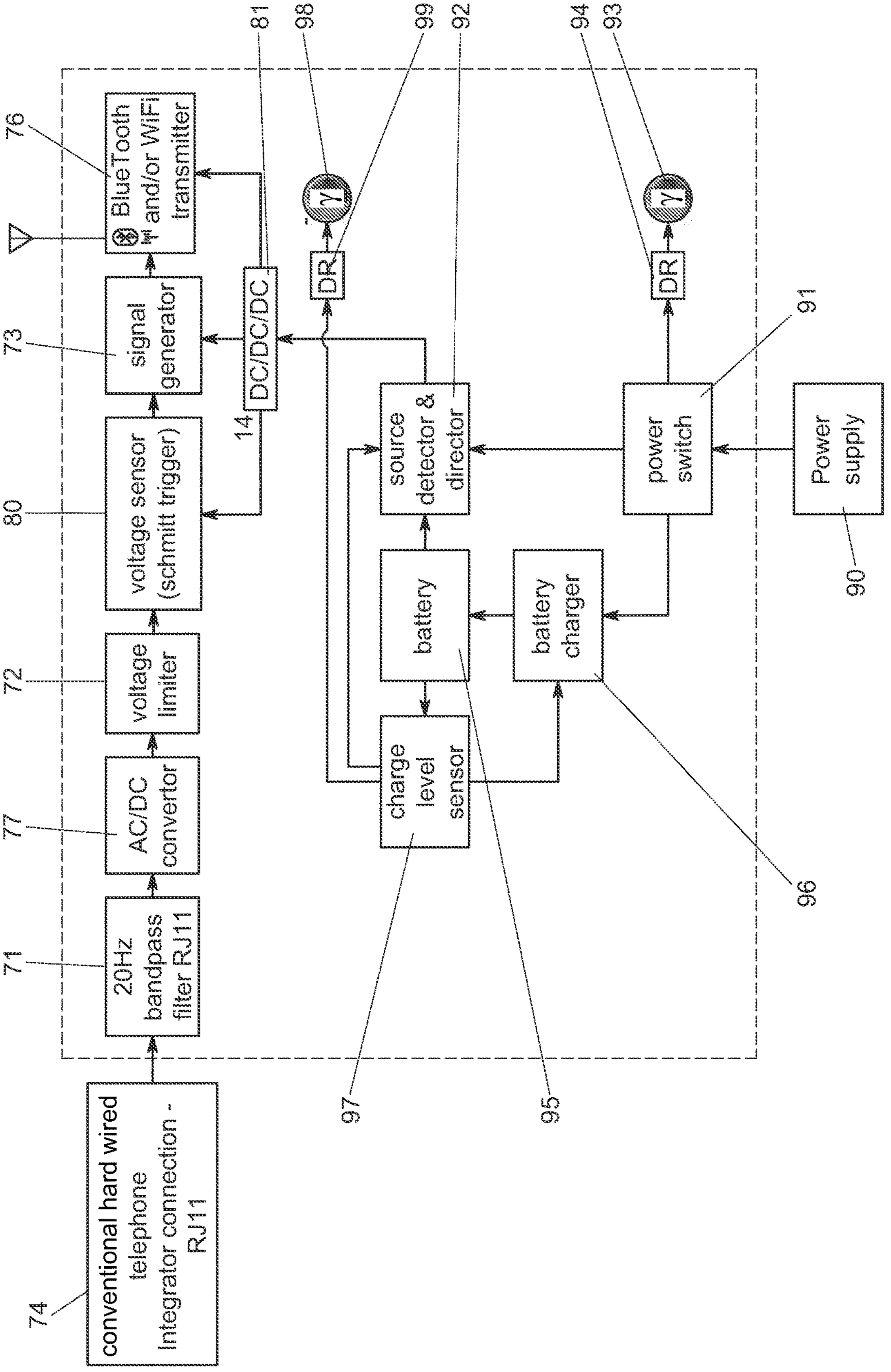
FIG. 4 is functional diagram of a conventional telephone wireless integrator with external power supply.

As shown in FIG. 3 and FIG. 4, an additional feature of the system is to connect conventional hard wired telephone line activity into an integrator circuit 70 of the notification system. This requires a 20 Hz bandpass filter 71 to filter the telephone ring signal eliminating all signal or noise>20 Hz, a voltage limiter 72, and a signal generator 73 for responding to the conventional telephone ring signal. This is connected to the alerting device 30 through conventional RJ11 hardware 74 or wirelessly connected through a dedicated Blue Tooth or WiFi transmitter.

FIG. 3 depicts a conventional hard-wired telephone with RJ11 connection passing ring signals to a wireless integrator circuit with an internal power supply. A supercapacitor 75 can be connected to the phone line using some of the conventional ring signal to charge the super capacitor 75. The charged supercapacitor 75 serves as the power supply for the signal generator 73 and/or transmitter 76. Another additional feature of the system is an automatic energy level control regulating the notification levels to preset maximums as determined by the user. An AC/DC convertor 77 is located between the bandpass filter 71 and voltage limiter 72 for converting the filtered ring signal into DC for charging supercap 75 and phone signal. The voltage limiter 72 protects supercap 75 NE charging voltage and simultaneously provides phone ring signal to AND gate 78 (Both AND gate inputs protected with Zener diode voltage clamps). The supercap 75 provides power storage, monitoring voltage to AND gate 78, and power for relay 79. When both inputs are present at the AND gate 78, a signal is sent to the Schmitt Trigger 80, which, when activated sends signal to the power relay 79. The power relay, when activated sends power the DC/DC convertor 81, which powers the signal generator 73 and the transmitter 76. The signal generator 73 sends a coded signal to the wireless transmitter 76, which wirelessly transmits the coded signal to the monolithic network (FIG. 2A) or polylithic MESH network (FIG. 2B, FIG. 2C) for the purpose of activating the alerting function of the alerting device 30.

FIG. 4 depicts a conventional hard-wired telephone with RJ11 connection passing ring signals to a wireless integrator circuit with an external power supply. The system of FIG. 4 is similar to the system of FIG. 3 wherein like components perform like functions. The power supply 90 is an "off the shelf" wall plug embodiment with a USB 2 or better output that can supply at least 5 volts DC, 1 amp. The Power Switch 91 is a single throw, double-pole powering the power source-detector 92. A multicolor (red or green) light source 93, such as an LED indicates ON/OFF (red is OFF, green is ON). If the indicator is an LED, a LED driver 94 is required.

The Power Source-Detector 92 normally sends power to the DC/DC/DC convertor 81. If the USB power fails, the Power Source-Detector 92 automatically switches to the battery 95, which is typically a 4.2V 2400 mAh lithium-ion battery. The battery charger 96 meets the requirement for charging the battery 95, and monitors the charge level sensor 97, which measures available battery energy. When charging a lithium-ion battery and an 85% charge level is reached, or the charge current falls to 3%, the charger is disengaged. A multicolor (red or green) light source 98, such as an LED, indicates charge level. (red<85%, green>85%). If the indicator is an LED, a LED driver 99 is required. The charge level sensor 97 sends a signal to the Power Source Detector 92 that the battery 95 is sufficiently charged to operate the Integrator Circuit 70. The DC/DC/DC converter 81 supplies power to the voltage sensor 80, signal generator 73 and transmitter 76.

The following are the system functions in outline form:

1) On/Off
2) Active or inactive button
3) System log-on protocol
4) System log-off protocol
5) Reset button - turns all functions off
    - (a) Re-arms system (notification ready for next event)
    - (b) Responding to a notification re-arms the system
6) Find a misplaced cellphone (A touch or mechanical button on the Embodiment)
7) Program Notification Methods
    - (a) Light
        - (i) Light source type
            1. LED
            2. Halogen
            3. CFL
            4. Incandescent
        - (ii) Kinetics
            1. Stationary (at least one light source)
            2. Flashing (at least one light source)
            3. Sinusoidal
        - (iii) Brightness
            1. Manual setting
                - a. Minimum
                - b. Maximum
            2. Automatic level control (once max has been set)
                - a. Adjusts responding to ambient light level -continued (iv) Embodiment Sequence
1. Speed
a. One Embodiment display only
b. Multiple Embodiments sequenced (guidance aid)
(v) Patterns (more than one light source)
1. Speed (constant or changing)
2. Brightness
a. Individual colors setting
3. Patterns
a. Rotational
b. Sinusoidal
c. Weave
d. Alternate
e. Dissolve
f. Pattern Sequence
(vi) Color
1. Choice
a. Color choices
i. RED, BLUE, YELLOW, GREEN, ORANGE, WHITE
b. Mixed colors
2. Individual color brightness level settings
(b) Sound
(i) Audio type
1. Sound Source
a. Conventional coil and magnet speaker
b. Piezoelectric speaker
c. Magnetostrictive speaker
d. Electrostatic speaker
e. Plasma arc speaker
2. Pitch selection
a. Monophonic monotone - single pitch (one frequency)
b. Monophonic monotone - single pitch with full or partial harmonic
c. Polyphonic - multiple pitch content (at least more than one frequency)
3. Sinusoidal variation
a. Periodicity
4. Square variation
a. Periodicity
5. Siren
a. Analog
b. Digital
6. Human Voice
a. Real
b. Artificial
7. White noise
8. Volume level
a. Manual (present)
b. Automatic volume control
i. Adjusts responding to ambient volume level
9. Sound Energy Source
a. Speaker
(ii) Mechanical type
1. Characteristic selection
a. vibration
b. hammer
c. clicker
2. Frequency
a. Periodicity - cycles/sec
3. Displacement
a. Amplitude - distance between peaks of motion
4. Velocity
a. Rate of motion displacement
5. Acceleration
a. Time to reach motion displacement
6. White noise
7. Intensity
a. Manual (preset)
b. Automatic intensity control
i. Adjusts responding to ambient vibration level
8) Data Collection (Optional)
(a) Notification type
(i) Light
(ii) Sound
(iii) Mechanical -continued (b) Notification source
(i) Phone
(ii) Pre-set time (an app function)
(iii) Remote sensor (smoke, fire, CO alarms, etc.)
(iv) Phone call
(v) Message
(vi) eMail
9) Mute function button
(a) Light
(b) Sound
(c) Mechanics
(d) All
10) Multiple embodiment (more than one Embodiment) deployed)
(a) Number of embodiments
(b) ID # assigned to each Embodiment
11) Physical Arrangements - Alert Embodiment
(a) Shape can be cylindrical, cube, polygonal, or a combination
(i) Typical diameter - 3 to 4 inches
(ii) Typica; height - 4 to 6 inches
(b) Light display can follow the z-axis perimeter tangentially about the embodiment (typically a complete path around the z-axis of the perimeter of the shape of the case).
(c) Alternately the light display can be arranged at other angles or in discrete sections.
(d) The light display can be in random path as opposed to a coherent path.
(e) There can be multiple displays such as more than one perimeter display.
(f) The top can be a polygon or hemisphere
(i) Not illuminated
(ii) Illuminated
(g) The bottom, top or side can have a means for attachment to something, i.e., call, refrigerator, ceiling, etc.

App Functions

The App is responsible for programing all Alert functions in the alert device 30. The programing and required responses are sent and received wirelessly via BlueTooth and/or WiFi domains. At the conclusion of any incoming phone call an Alert end-command is issued regardless of the response state—answered, dismissed, handled by voicemail, or ignored. The following are all the App functions available through the App GUI:

1. Home
2. Log In/Log Out
3. User Setup
4. User profile
5. Pair Devices—wireless pairing function
6. Embodiment Location Assignment
7. Repeater Location Assignment (optional)
8. Map (optionable)
9. Selected Contacts Management—assign Alert method and characteristics
10. Random Contacts Management—assign Alert method and characteristics
11. Preset Notification Alert set date and time, assign method and characteristics
12. Hardline Phone—setup, assign method and characteristics
13. Battery(s) condition—Embodiment(s) and Repeaters
14. Find My App "home"—App home location typically a smart phone
15. Edit (any programing input)
16. Clock with date
17. Update Notification—both operating software and firmware
18. Update—manual or automatic
19. Terms & Privacy—standard caveats including warranty
20. Contact Us—phone number and email template The App can, if required, communicate with a dedicated Cloud database 49 for any stored data needed to setup, operate, update software and/or firmware, review operating history, and user's operating selections. All functions are editable if (touch, point, or click) "edit" and "done" is displayed on each given screen. All changes or additions become permanent by activating "done." The following are the system functions in outline form:

1) Initialization
a) ID GUI.
i) Sign-up
ii) Sign-on
iii) Email
iv) Password
v) Security code
2) Cohort Pairing, Location, Map
a) First time
i) Scan for pairing - all cohort elements require a dedicated scan for each embodiment or repeater -continued (1) Embodiment(s)
(a) Signal Confirmation
(b) Location
(2) Repeater(s)
(a) Signal Confirmation
(b) Location
(3) Map - Location of all cohort elements
a) Expansion
i) Scan for pairing - the added cohort element(s) require a dedicated scan for each embodiment or repeater
(1) Embodiment(s)
(a) Signal Confirmation
(b) Location
(2) Repeater(s)
(a) Signal Confirmation
(b) Location
(3) Add to Map
3) Contacts
a) Details
i) Name
ii) Address
iii) Email
iv) Phone number (hardline, if any)
v) Smartphone number
4) Alert Style Programming
a) Light Program
i) Display Color(s) - Choose palette (4 colors maximum/cycle)
(1) First color
(a) RGB selection
(2) Second color (if applicable)
(a) RGB selection
(b) none
(3) Third color (if applicable)
(a) RGB selection
(b) none
(4) Fourth color (if applicable)
(a) RGB selection
(b) None
ii) Individual LED color assignment (only 4 colors can be selected)
(1) LED #1
(a) RGB selection (red)
(2) LED #2
(a) RGB selection (yellow)
(3) LED #3
(a) RGB selection (blue)
(4) LED #4
(a) RGB selection (green)
(5) LED #5
(a) RGB selection (purple)
(6) LED #6
(a) RGB selection (orange)
(7) LED #7
(a) RGB selection (white)
(8) LED #8
(a) RGB selection (no color)
iii) Color brightness
(1) Color #1
(a) minimum/maximum adjustment (lumens)
(2) Color #2
(a) minimum/maximum adjustment (lumens)
(3) Color #3
(a) minimum/maximum adjustment (lumens)
(4) Color #4
(a) minimum/maximum adjustment (lumens)
i) Patterns (more than one light source)
1) Parametric Speed
(a) Rate
i. 1 to n cycles/min
(b) Rate Variability
i. Staionary
ii. Analog
1. Sinusoidal - 1 to n cycles/minute (flux variation)
2. Sawtooth - 1 to n cycles/minute (flux variation)

-continued iii. Digital
1. Square wave - 1 to n cycles/minute (on/off)
2. Duty cycle - 1 to n ratio (phase)
iv. Patterns
1. Rotational
a. Direction - right/left (from observers position)
2. Alternate Group Size
a. 1---2---3---4---5---6---7---8---
b. 1,2---3,4---5,6---7,8---
c. 1,2,3,4---5,6,7,8---
3. Kinetics
a. Stationary
b. Flashing
c. Sinusoidal
4. Flux Density (brightness)
a. Manual setting (relative settings for all colors)
i. Minimum/maximum adjustment
b. Automatic level control (once max has been set)
i. Responds to ambient light level
a) Sound Program
i. Transducer Type
(1) Conventional coil and magnet speaker
(2) Piezoelectric speaker
(3) Magnetostrictive speaker
(4) Electrostatic speaker
(5) Plasma arc speaker
vi) Pitch selection
(1) Monophonic monotone - single pitch (one frequency)
(2) Monophonic monotone - single pitch with full or partial harmonic
(3) Polyphonic - multiple pitch content (at least more than one frequency)
iii) Variation selection
(1) Analog (sinusoidal)
(2) Digital (square)
(3) Flat
iv) Sound Style Selection
(1) Flat
(2) Siren
(a) US fire engine style
(b) Domestic style
(c) European style
(3) Human Voice
(a) Real
(b) Artificial
(4) White Noise
(5) Clicker
(6) Scratch -continued v) Volume Level Setting
(1) Manual (preset)
(2) Automatic volume control - adjusts according to ambient sound levels b) Mechanical
i. Transducer Type
(1) Vibrator
(2) Hammer
(3) Clicker
(4) Scratcher
ii) Frequency
(1) Monophonic monotone - single pitch (one frequency)
(2) Monophonic monotone - single pitch with full or partial harmonic
(3) Polyphonic - multiple pitch content (at least more than one frequency)
iii) Intensity Level Setting
(1) Manual
(2) Automatic volume control - adjusts according to ambient sound levels 5) Alert Event Timing
a) Daily
i) Year
ii) Time
(1) Hour - quarters
(2) AM/PM
b) Weekly
i) Day or days of the week
c) Daily
d) Alert event name 6) Battery
a) Charge level status
i) Embodiment(s)
ii) Repeater(s)

7) Find my App device
a) Type
i) Smartphone
ii) Tablet
iii) Laptop
iv) Desktop
v) Other
b) Pitch selection
i) Monophonic monotone - single pitch (one frequency)
ii) Monophonic monotone - single pitch with full or partial harmonic
iii) Polyphonic - multiple pitch content (at least more than one frequency)
c) Variation selection
i) Analog (sinusoidal)
ii) Digital (square)
iii) Flat
d) Sound Style Selection
i) Flat
ii) Siren
2) US fire engine style
3) Domestic style
4) European style
iii) Human Voice
2) Real
3) Artificial
iv) White Noise
v) Clicker
vi) Sctratch
e) Volume Level Setting
(1) Manual (preset)
(2) Automatic volume control - adjusts according to ambient sound levels 8) Hard Line Phone
vii) Pitch selection
(4) Monophonic monotone - single pitch (one frequency)
(5) Monophonic monotone - single pitch with full or partial harmonic
(6) Polyphonic - multiple pitch content (at least more than one frequency)
iv) Variation selection
(2) Analog (sinusoidal)
(3) Digital (square)
(4) Flat -continued iv) Sound Style Selection
(4) Siren
(a) US fire engine style
(b) Domestic style
(c) European style
(5) Human Voice
(a) Real
(b) Artificial
(7) White Noise
(8) Clicker
(9) Scratch
(10) Buzzer
v) Volume Level Setting
(1) Manual (preset)
(2) Automatic volume control - adjusts according to ambient sound levels
9) Hardline Telephone
a) Pair
i) Hard wire
ii) Wireless
iii) Display
(1) Connected (app icon)
b) Hardline Ring
i) Bell
ii) Buzzer
10) Clock and Calendar This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

We claim:

1. An apparatus for alerting individuals experiencing sensory limitations and/or sensory interference comprising:
- a user interface device including a transceiver, a program and a reporting application;
- a hard wired telephone;
- an integrator circuit electrically coupled to the hard wired telephone, said integrator circuit including a signal generator coupled to a transmitter; and
- an alerting unit in wireless communication with said transceiver of said user interface device and also in communication with said transmitter of said user integrator circuit, said alerting unit comprising:
  - a transceiver for wirelessly communicating with said user interface device and said hard wired telephone through said integrator circuit;
  - a central processing unit for receiving and processing communications from said transceiver and said transmitter;
  - an alert notification device coupled to said central processing unit, said alert notification device configured to provide an alert to a user upon receipt of an alert signal from said central processing unit; and
  - a power supply for providing power to the central processing unit, transceiver and alert notification device of the alerting unit.

2. The apparatus for alerting individuals according to claim 1, wherein said user interface device is selected from a group consisting of a smartphone, a laptop computer, a desktop computer and a tablet computing device.

3. The apparatus for alerting individuals according to claim 1, wherein the alert notification device is selected from a group consisting of a light source, a sound source and a mechanical source.

4. The apparatus for alerting individuals according to claim 3, further comprising a driver connected to the alert notification device and a power supply electrically coupled to the driver.

5. The apparatus for alerting individuals according to claim 4, wherein the driver is connected to the central processing unit which provides instructions to the driver based upon a software notification subroutine.

6. The apparatus for alerting individuals according to claim 1, further comprising a plurality of alerting units arranged in a mesh network, each alerting unit in wireless communication with the user interface device and each of the other plurality of alerting devices.

7. The apparatus for alerting individuals according to claim 6, wherein each alerting unit comprises a mesh network node and functions as a repeater node.

8. The apparatus for alerting individuals according to claim 7, further comprising a repeater node in wireless communication with the user interface device and each of the plurality of alerting devices.

9. The apparatus for alerting individuals according to claim 8, wherein said repeater node comprises a plurality of repeater nodes.

10. An apparatus for alerting individuals experiencing sensory limitations and/or sensory interference comprising:
- a hard wired telephone;
- an integrator circuit electrically coupled to the hard wired telephone, said integrator circuit including a signal generator coupled to a transmitter; and
- an alerting unit in wireless communication with said transmitter of said user integrator circuit, said alerting unit comprising:
  - a transceiver for wirelessly communicating with said user integrator circuit;
  - a central processing unit for receiving and processing communications from said transceiver;
  - an alert notification device coupled to said central processing unit, said alert notification device configured to provide an alert to a user upon receipt of an alert signal from said central processing unit; and a power supply for providing power to the central processing unit, transceiver and alert notification device of the alerting unit.

11. The apparatus for alerting individuals according to claim 10, wherein said integrator circuit further comprises a 20 Hz bandpass filter electrically coupled to the hard wired phone and the integrator circuit to filter the telephone ring signal.

12. The apparatus for alerting individuals according to claim 11, wherein said integrator circuit further comprises a voltage limiter disposed between the bandpass filter and the signal generator.

13. The apparatus for alerting individuals according to claim 12, wherein the integrator circuit has an internal power supply.

14. The apparatus for alerting individuals according to claim 13, wherein the internal power supply comprises a supercapacitor having an input coupled to the voltage limiter and an output coupled to an AND gate/voltage sensor and a relay.

15. The apparatus for alerting individuals according to claim 12, wherein the integrator circuit has an external power supply.

16. The apparatus for alerting individuals according to claim 15, further comprising a battery backup power supply.

17. A method for alerting individuals experiencing sensory limitations and/or sensory interference comprising the steps of:

generating a wireless signal from an integrator circuit electrically coupled to a hard wired telephone;

transmitting said wireless signal from a transmitter associated with said integrator circuit;

receiving said wireless signal at a transceiver of an alerting unit;

using a central processing unit to process said signal utilizing a notification subroutine; and sending a signal from the central processing unit based on the notification subroutine to an alert notification device coupled to said central processing unit; and generating a notification to a user.

18. The method for alerting individuals according to claim 17, wherein the notification generated is selected from a group consisting of a light notification, sound notification and mechanical notification.

19. The method for alerting individuals according to claim 17, further comprising the step of transmitting said wireless signal between a plurality of alerting units and/or repeater nodes arranged in a mesh network.

* * * * *